(12) United States Patent
Uchino et al.

(10) Patent No.: US 6,222,817 B1
(45) Date of Patent: Apr. 24, 2001

(54) DISK APPARATUS HAVING A DUST PROOF CONSTRUCTION

(75) Inventors: Tsutomu Uchino; Takashi Sato; Hiroyunki Hanai; Mitsunori Nakamura, all of Atsugi (JP)

(73) Assignee: Mitsumi Electric Co., Ltd., Atsugi (JP)

( * ) Notice: Subject to any disclaimer, the term of this patent is extended or adjusted under 35 U.S.C. 154(b) by 6 days.

(21) Appl. No.: 09/294,986

(22) Filed: Apr. 20, 1999

Related U.S. Application Data

(62) Division of application No. 08/801,100, filed on Feb. 14, 1997, now abandoned, which is a continuation of application No. 08/363,387, filed on Dec. 23, 1994, now abandoned.

(30) Foreign Application Priority Data

Dec. 24, 1993 (JP) .................................................. 5-69414
Dec. 27, 1993 (JP) .................................................. 5-69634
Dec. 27, 1993 (JP) .................................................. 5-69859

(51) Int. Cl.⁷ .................................................. G11B 23/00
(52) U.S. Cl. .................................................. 369/270
(58) Field of Search .................................. 369/77.2, 75.1, 369/75.2, 77.1, 270

(56) References Cited

U.S. PATENT DOCUMENTS

| | | | |
|---|---|---|---|
| 4,654,840 | * 3/1987 | Takahashi | 369/75.2 |
| 4,965,684 | 10/1990 | Stefansky | 360/78.12 |
| 5,187,621 | 2/1993 | Tacklind | 360/97.02 |
| 5,204,850 | 4/1993 | Obata . | |
| 5,214,549 | 5/1993 | Baker et al. | 360/97.02 |
| 5,255,254 | 10/1993 | Watanabe et al. | 369/75.1 |
| 5,282,101 | 1/1994 | Reinish | 360/97.03 |
| 5,301,178 | 4/1994 | Okabe et al. | 369/77.1 |
| 5,381,393 | * 1/1995 | Ohtani | 369/77.2 |
| 5,416,655 | * 5/1995 | Aimiya | 360/99.08 |
| 5,426,628 | 6/1995 | Ishii | 369/77.1 |
| 5,477,401 | 12/1995 | Squires et al. | 360/97.02 |

FOREIGN PATENT DOCUMENTS

| | | |
|---|---|---|
| 3-88169 | 4/1991 | (JP) . |
| 4-268283 | 4/1992 | (JP) . |
| 5-266562 | 10/1993 | (JP) . |
| 5-266563 | 10/1993 | (JP) . |
| 5-266564 | 10/1993 | (JP) . |
| 5-266565 | 10/1993 | (JP) . |
| 6-84255 | * 3/1994 | (JP) . |

* cited by examiner

*Primary Examiner*—David Davis
(74) *Attorney, Agent, or Firm*—Anderson, Kill & Olick P.C.

(57) ABSTRACT

There is provided a disk apparatus having a construction in which a reproducing unit is accommodated inside an enclosed space, whereby an optical head is protected from external dust. The optical head reads information recorded on a disk. Component parts of the disk apparatus are accommodated inside a case. The optical head is provided on a chassis formed in a box-like shape, the chassis having walls with ends which have contacting surfaces which come in contact with the case. A circuit board assembly which receives circuit processing information from the optical head is positioned outside the chassis. The chassis and the case together form an enclosed space, the optical head being accommodated inside the enclosed space.

6 Claims, 13 Drawing Sheets

DISK APPARATUS HAVING A DUST PROOF CONSTRUCTION

This application is a divisional of U.S. patent application Ser. No. 08/801,100 filed Feb. 14, 1997 now abandoned which is a continuation of U.S. patent application Ser. No. 08/363,387 filed Dec. 23, 1994 now abandoned.

BACKGROUND OF THE INVENTION

The present invention generally relates to a disk apparatus, and more particularly to a disk apparatus which has a dust proof construction ensuring an effective release of heat, a reduced thickness and easy to assemble.

FIG. 1 shows a conventional optical disk apparatus 10.

The optical disk apparatus 10 comprises a bottom plate 11 on which a circuit board assembly 12 and a reproducing unit 13 are mounted. A disk tray 14 is movable in directions indicated by arrows A1 and A2. A case 15 having a top plate 15a and side plates 15b covers the reproducing unit 13 having an optical head 22 (see FIG. 2) and the circuit board assembly 12, and is mounted on the bottom plate 11 by means of screws. Accordingly, the reproducing unit 13 and the circuit board assembly 12 are enclosed in the apparatus, and thus the optical head 22 is protected from external dust.

In the above-mentioned optical disk apparatus 10, since the circuit board assembly 12 is enclosed in the apparatus, when the apparatus is used, and in particular, uses continuously for a long time, the temperature inside the apparatus considerably increases due to heating of the circuit board assembly 12.

In order to reduce the temperature increase, hot air inside the optical disk apparatus 10 is released to the outside, and external cool air is introduced into the apparatus. However, in this case, dust may enter inside the apparatus together with the cool air introduced inside the apparatus, and thus there is a problem in that the dust adheres onto the optical head.

FIG. 2 is a schematical perspective view of the conventional optical disk apparatus 10.

In FIG. 2, a mechanical unit 25 comprises a base 19 pivotally provided on a chassis 17 by being supported by a shaft 18 on one end thereof, a turn table driving motor 20, a turn table 21 and the optical head 22 being mounted on a base 19.

Reference numeral 23 indicates a gate-type disk clamper supporting member which is mounted on the chassis 17 to be bridged over the mechanical unit 25.

A stem 16a of a disk clamper 16 is fitted in a through hole 23a of the supporting member 23, as shown in FIG. 3A, and is attached to the supporting member 23 by a screw 24 serving as a stopper.

A disk 30 is loaded in the optical disk apparatus 10 in the manner as explained below.

In an initial state, the mechanical unit 25 is inclined as shown in FIG. 3A, and thus the turn table 21 is located at a lower position. The disk 30 is placed on a tray 14, and then is carried into the optical disk apparatus 10. When the disk 30 is carried into the apparatus, a lifting mechanism 26 starts to operate to rotate the mechanical unit 25 in a direction indicated by an arrow A, the mechanical unit 25 being rotated to be horizontally positioned as indicated in FIG. 3B.

Accordingly, as shown in FIG. 3B, the disk 30 is supported by the turn table 21 in a state where the disk 30 is lifted up from the tray 14. Additionally, the disk clamper 16 is magnetically attracted by the turn table 21, and thus the disk 30 is clamped. After the disk 30 is clamped, the turn table 21 is rotated by the motor 20, and then information on the disk 30 is reproduced by means of the optical head 22.

In the above-mentioned disk loading mechanism, since the disk clamper supporting member 23 is located above the disk clamper 16, and since the top plate 15a of the case 15 covers the supporting member 23, there is a problem in that a height $h_{10}$ (refer to FIG. 3A) of the optical disk apparatus 10 is relatively great, thus preventing the thickness of the apparatus from being reduced.

FIG. 4 is a schematic view showing how the optical head 22 is connected to the reproducing unit 13 of the optical disk apparatus 10. In the optical disk apparatus 10, the reproducing unit 13 and the circuit board assembly 12 are arranged on the chassis 17 in a state where they are piled on top of each other. The reproducing unit 13 is provided with the turn table 21 and the optical head 22 movable in directions indicated by arrows X1 and X2.

A tape-like flexible printed circuit (FPC) 27 extends from the optical head 22. The FPC 27 extends through an opening 17a formed in the chassis 17, and is connected to an FPC connector 28 mounted on the circuit board assembly 12 located under the chassis 17.

An operation for connecting the FPC 27 to the FPC connector 28 is carried out by using a jig 29 as shown in FIG. 5. One end of the FPC 27, the other end of which is connected to the optical head 22, is drawn out to extend to the lower side of the chassis 17 by passing it through the opening 17a while the reproducing unit 13 is held in an oblique state by means of the jig 29. The one end of the FPC 27 is then inserted into the FPC connector 28, as shown by an arrow B in FIG. 5.

Since the operation for connecting the FPC 27 to the FPC connector 28 must be performed in a relatively narrow space, there is a problem in that the operation is inconvenient and takes a long time. Additionally, since the FPC 27 is being made as short as possible from the view point of cost reduction, there is a possibility of the FPC 27 being drawn out accidentally by a strong force, thereby damaging the optical head 22.

SUMMARY OF THE INVENTION

It is a general object of the present invention to provide an improved and useful disk apparatus in which the above-mentioned problems are eliminated.

A more specific object of the present invention is to provide a disk apparatus having a construction in which only a reproducing unit is accommodated in an enclosed space, and thus an optical head is protected from external dust.

Another object of the present invention is to provide a disk apparatus having a thickness which is reduced by eliminating the use of a supporting member for a disk clamper.

Another object of the present invention is to provide a disk apparatus in which an operation for connecting the optical head to a circuit board assembly is easily performed by having a connector on a chassis of a reproducing unit.

In order to achieve the above-mentioned objects, there is provided according to one aspect of the present invention a disk apparatus having a head for reading information recorded on a disk, the disk apparatus comprising:

a case accommodating component parts of said disk apparatus;

a chassis, formed substantially in a box-like shape, having a chassis body on which the head is mounted, the chassis body having walls on sides thereof, each of the walls having a contacting surface on an upper end thereof which contacting surface comes into substantial contact with the case; and a circuit board assembly positioned inside the case and outside the chassis, a circuit which processes information input from the head being provided on the circuit board assembly, wherein the chassis together with the case form an enclosed space, and the head is accommodated inside the enclosed space so as to be protected from external dust.

According to another aspect of the present invention, there is provided a disk apparatus in which a disk is lifted by a turn table moving upward, and a clamper positioned above the turn table clamps the disk on the turn table, the disk apparatus comprising:

a case having a top plate which covers the turn table; and a clamper mounting portion formed on the top plate, the clamper being mounted on the clamper mounting portion.

According to another aspect of the present invention, there is provided a disk apparatus having a mechanism assembly having a chassis on which a head for reproducing information recorded on a disk is provided and a circuit board assembly having a circuit which processes the information received from the head, the circuit board assembly being positioned under the mechanism assembly, the disk apparatus comprising:

a flexible connecting wire, extended from the head, for transmitting information from the disk;

a first connector, provided on the chassis, having connector pins protruding downward from the chassis, one end of the flexible connecting wire being connected to the first connector provided on the chassis; and a second connector located at a position corresponding to that of the connector pins of the first connector, wherein the first connector is automatically connected to the second connector when the circuit board assembly and the chassis are assembled together.

Other objects, features and advantages of the present invention will become more apparent from the following detailed description when read in conjunction with the accompanying drawings.

DETAILED DESCRIPTION OF THE PREFERRED EMBODIMENTS

Figure 6:
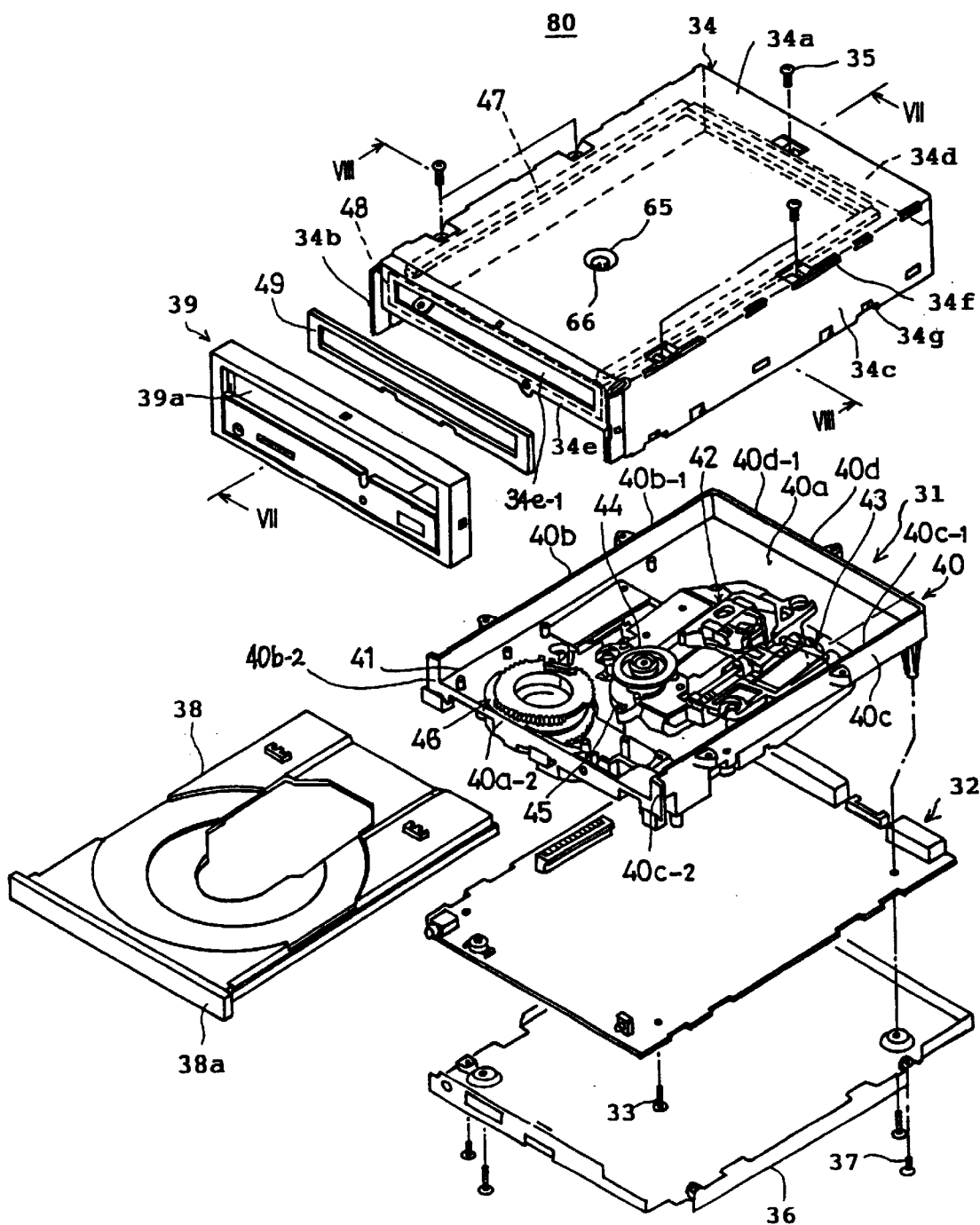
FIG. 6 is an exploded perspective view of a first embodiment of a CD-ROM apparatus according to the present invention.
Figure 7:
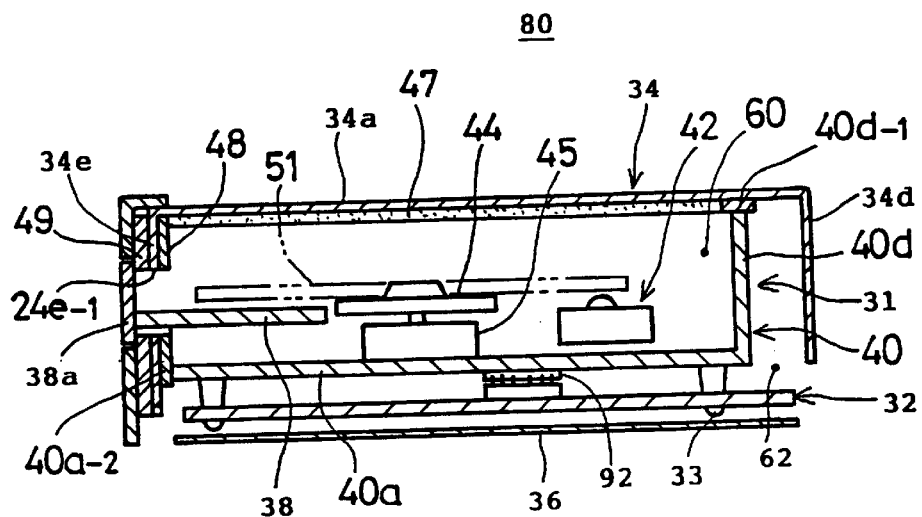
FIG. 7 is a cross-sectional view taken along a line VII—VII of FIG. 6.
Figure 8:
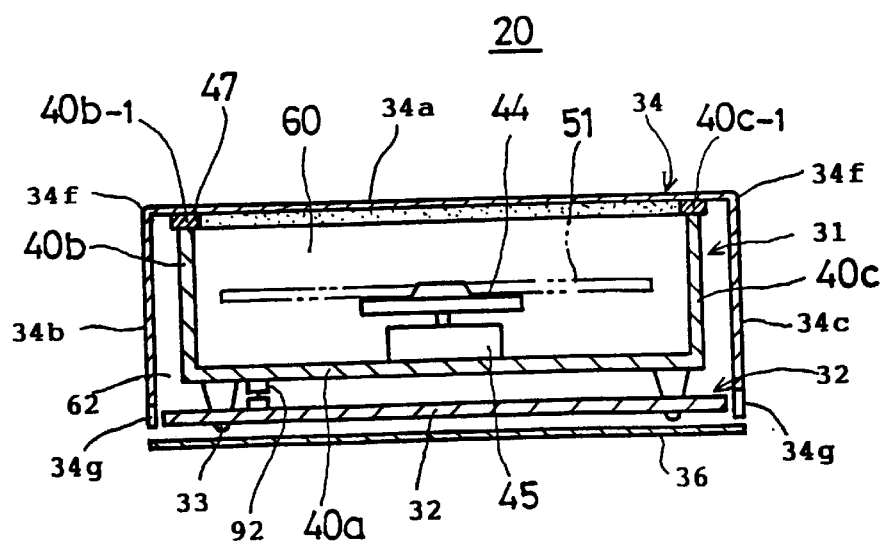
FIG. 8 is a cross-sectional view taken along a line VIII—VIII of FIG. 6.

FIG. 6 is a perspective view of an embodiment of a CD-ROM apparatus 80 according to the present invention. FIG. 7 is a cross-sectional view of the assembled CD-ROM apparatus 80 taken along a line VII—VII of FIG. 6, and FIG. 8 is a cross-sectional view taken along a line VIII—VIII of FIG. 6.

In the CD-ROM apparatus 80, mechanism assembly 31 and a circuit board assembly 32 ar assembled together by means of screws 33 in a state where the mechanism assembly 31 is placed above the circuit board assembly 32. A case 34 covers the mechanism assembly 31, and is attached thereto by means of screws 35. A bottom plate 36 covers the underside of the circuit board assembly 32, and is attached to thereto by means of screws 37. A reference numeral 38 indicates a disk tray, and 39 a front bezel.

A chassis 40 having substantially a box-like shape comprises a chassis body 40a having a generally plate-like shape and walls 40b, 40c and 40c. The wall 40b is on the left side of the chassis body 40a when viewed from the front bezel 39. The wall 40c is on the right side of the chassis body 40a when viewing from the front bezel 39. The wall 40d is raised on the side of the chassis body 40a opposite to the front bezel 39. The walls 40a, 40b and 40c are connected to form a channel-like shape when viewed from above. Additionally, top surfaces 40b-1, 40c-1, 40d-1 of the walls 40b, 40c, 40d are positioned in the same plane.

A wall is not provided on a front bezel side of the chassis body 40a, and thus an opening 41 is formed. End surfaces 40a-2, 40b-2, 40c-2 are formed on a front bezel side of each of the chassis body 40a and walls 40b and 40c, respectively.

An optical head 42, an optical head moving mechanism 43, a turn table 44, a turn table driving motor and tray moving mechanism 46 are provided in the chassis 40. As shown in FIGS. 7 and 8, a disk 51 is rotated by means of the motor 45 in an enclosed space 60 in a state where the disk 51 is placed on the turn table 44. Information recorded on the disk 51 is reproduced by means of the optical head 42.

The case 34 comprises a top plate 34a, left and right side plates 34b, 34c, a back plate 34d and a front plate 34e. An opening 34e-1 through which the tray 38 is moved is formed on the front plate 34e. A sponge tape 47 having a shape corresponding to the walls 40b, 40c, 40d of the chassis 40 is attached on an inner surface of the top plate 34a. Additionally, a frame 48 made of a sponge is attached on an inner surface of the front plate 34e so that the frame 48 encircles the opening 34e-1.

The chassis 40 and the case 34 are assembled together, as shown in FIGS. 7 and 8, in a state where the sponge tape 47 is sandwiched between the top plate 34a of the case 34 and the surfaces 40b-1, 40c-1, 40d-1 of the walls 40b, 40c, 40d, respectively, and in a state where the sponge frame 48 is sandwiched between the front plate 34e and the end surfaces 40a-2, 40b-2, 40c-2 of the chassis body 40a and walls 40b, 40c.

As mentioned above, the top plate 34a covers the upper side of the chassis body 40a. Additionally, an opening 39a of the front bezel 39 is closed by a front panel 38a of the tray 38.

Accordingly, the space 60 in the box-like chassis 40 is enclosed to have a dust proof construction, and thus the optical head 42 provided in the chassis 40 is protected from dust. That is, the sponge tape 47 and the sponge frame 48 serve as sealing members, and therefore a highly effective dust protection is obtained.

Additionally, in a state where the tray 38 is retracted in the CD-ROM apparatus 80, as shown in FIG. 7, the front panel 38a of the tray 38 presses the front plate 34e with a sponge frame 49 therebetween.

This seals the opening 34e-1 very well, and thus further effective protection of the chassis against dust is obtained.

An electrical connection of the mechanism assembly 31 to the circuit board assembly 32 is provided through a connector 92 protrudingly and downwardly mounted on the chassis body 40a. A portion of the chassis body 40a around the connector 92 is closed by a mounting board of the connector 92. Thus, the space 60 in the chassis 40 is further sealed.

Figure 1:
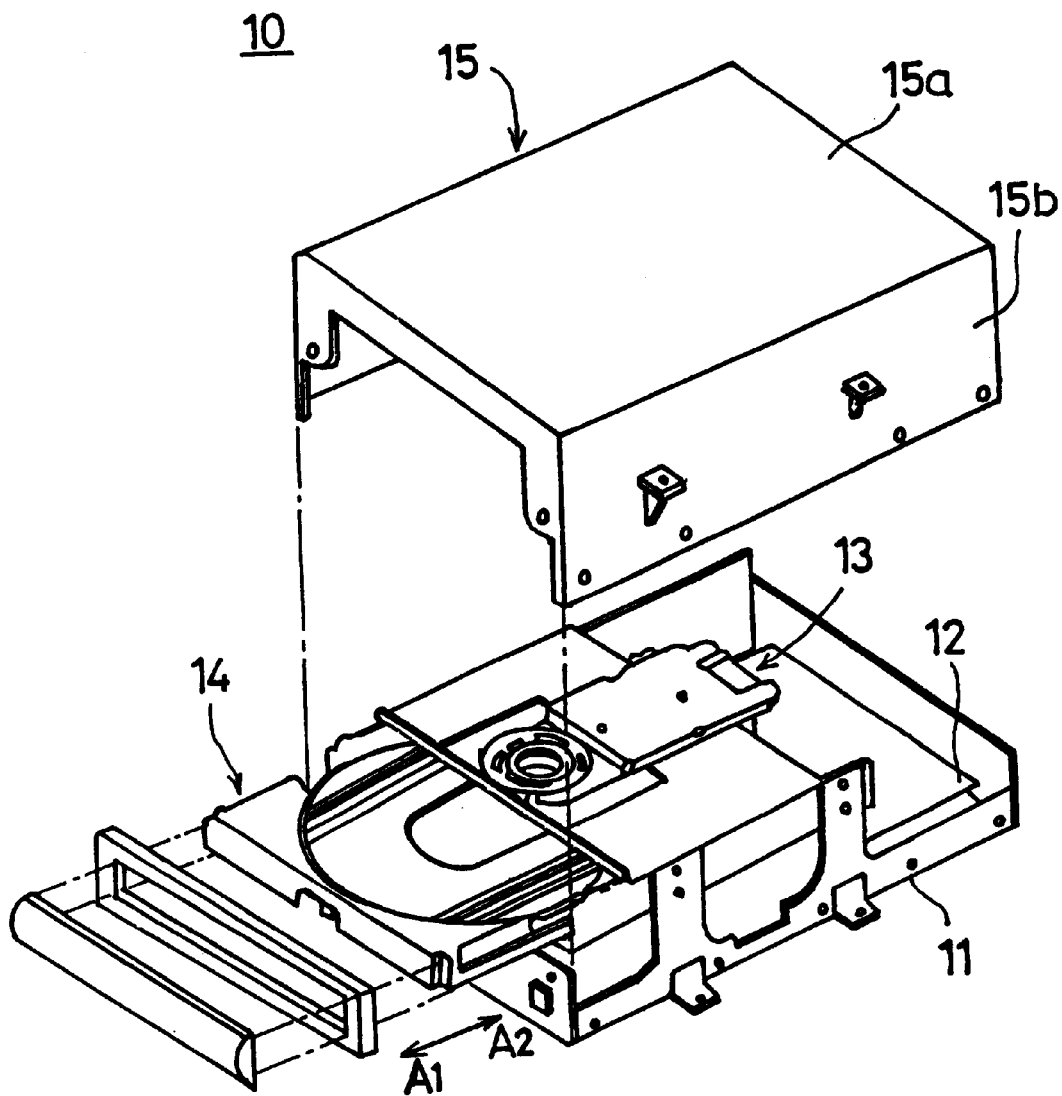
FIG. 1 is a perspective view of a conventional disk apparatus.
Figure 2:
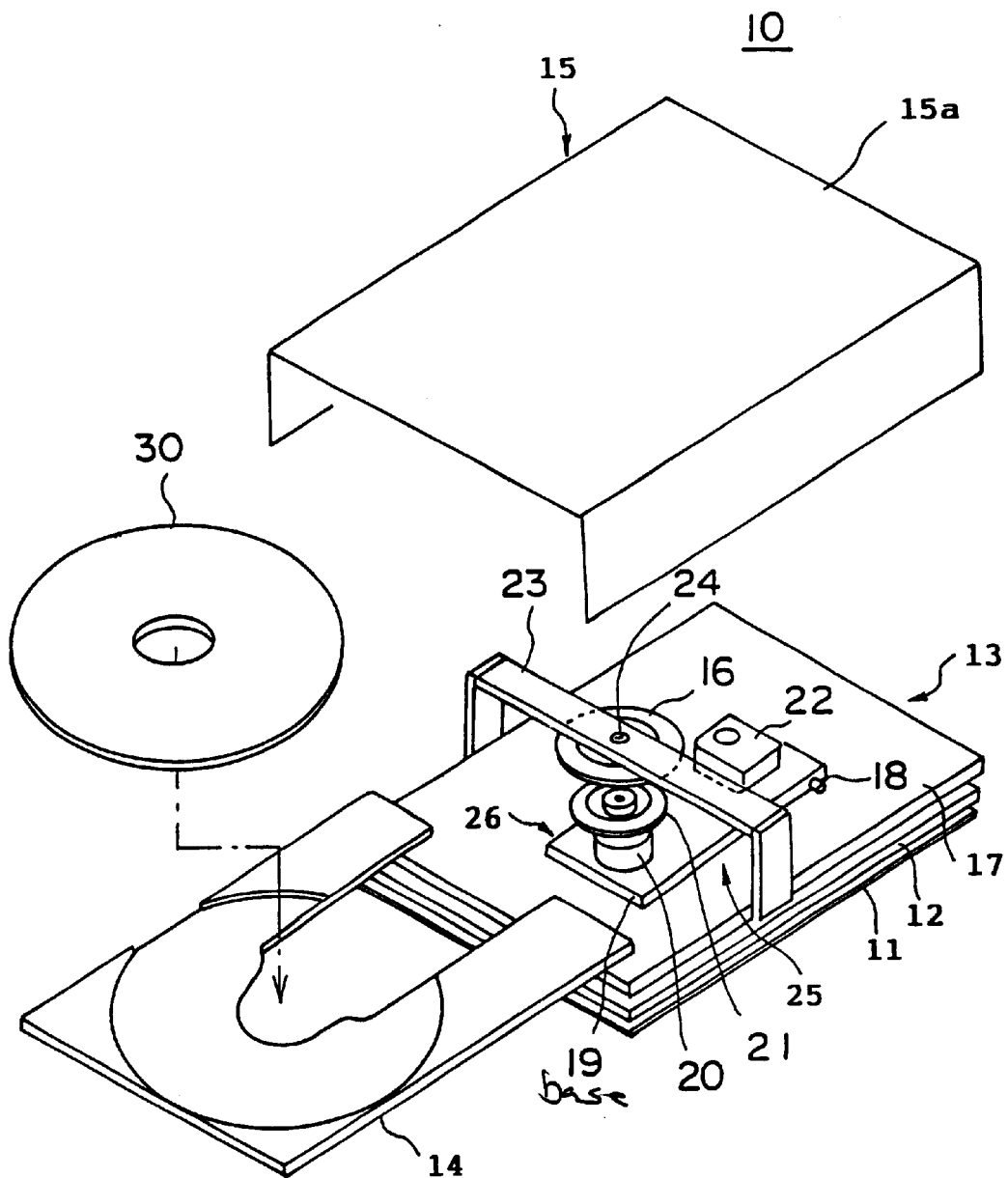
FIG. 2 is a perspective view for explaining a disk clamping mechanism in the disk apparatus shown in FIG. 1.

The inventor of the present application investigated the amount of dust adhered to the optical head by observing a degradation of a reproducing level of each of the CD-ROM apparatus 80 according to the present embodiment and the conventional optical disk apparatus 10 shown in FIG. 1 by placing them in a dusty area. The result of the investigation showed that the CD-ROM apparatus 80 according to the present embodiment had a dust protection level 4 to 5 times higher than that of the conventional optical disk apparatus 10.

A description will now be given, with reference to FIG. 8, of how heat is released from the circuit board assembly 32.

The circuit board assembly 32 is positioned under the chassis 40 at a slight distant therefrom, and accommodated inside a space 62 formed by the case 34 and the bottom plate 36.

The case 34 has a plurality of small ventilation holes 34f along a border between the top plate 34a and the side plates 34b, 34c. Additionally, the case 34 has a plurality of ventilation holes 34g. Accordingly, the space 62 is provided with many ventilating holes.

Therefore, hot air produced by heat generated in the circuit board assembly 32 passed through the ventilation holes 34f, 34g to be released outside the CD-ROM apparatus 80, and thereby releasing of the heat from the circuit board assembly 32 is performed.

As a result, the mechanism assembly 31 is not affected by heat, which condition results in a continuous normal operation being possible even if the CD-ROM apparatus 80 is operated for a long time so that a lot of heat generated by the circuit board assembly 32.

Figure 9:
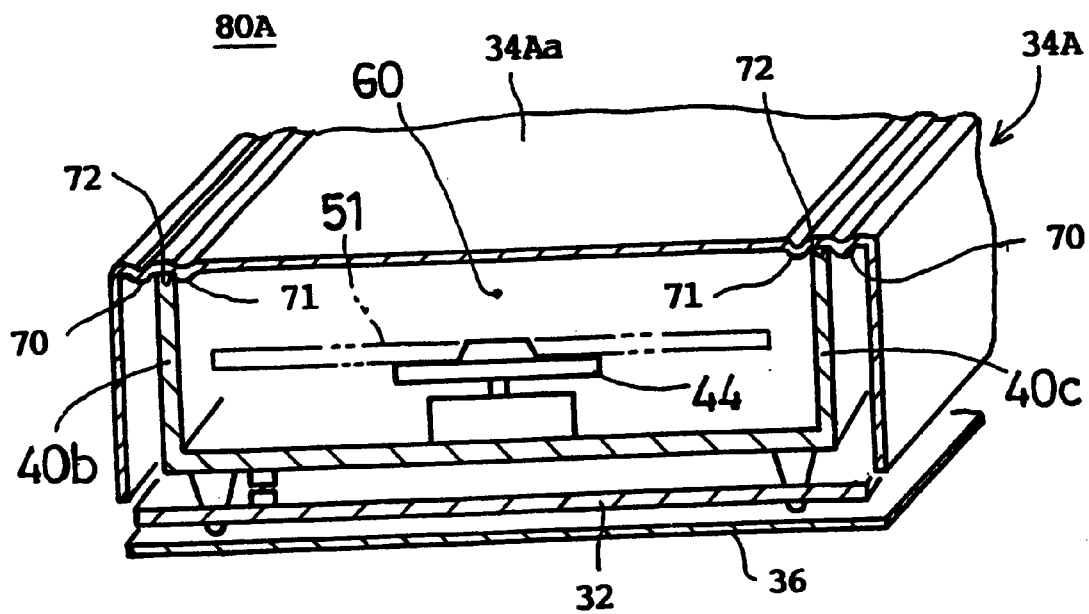
FIG. 9 is a perspective view for explaining a variation of an enclosing structure shown in FIG. 6.

FIG. 9 shows a variation of the above-mentioned embodiment.

A CD-ROM apparatus 80A shown in FIG. 9 has a case 34A. A top plate 34Aa of the case 34A has an elongated protrusions 70 on one side thereof and an elongated protrusion 71 on another side thereof in portions corresponding to the position where the sponge tape 47 is provided in FIG. 6, a grooves 72 being formed between the two protrusions 70 and 71. In this construction, an upper end of each of the walls 40b, 40c, 40d of the chassis 40 fits in the groove 71, and thus a seal between the top plate 34Aa and each of the walls 40b, 40c, 40d is provided. Accordingly, in this variation, the sponge tape 47 shown in FIG. 6 is not provided.

Figure 10:
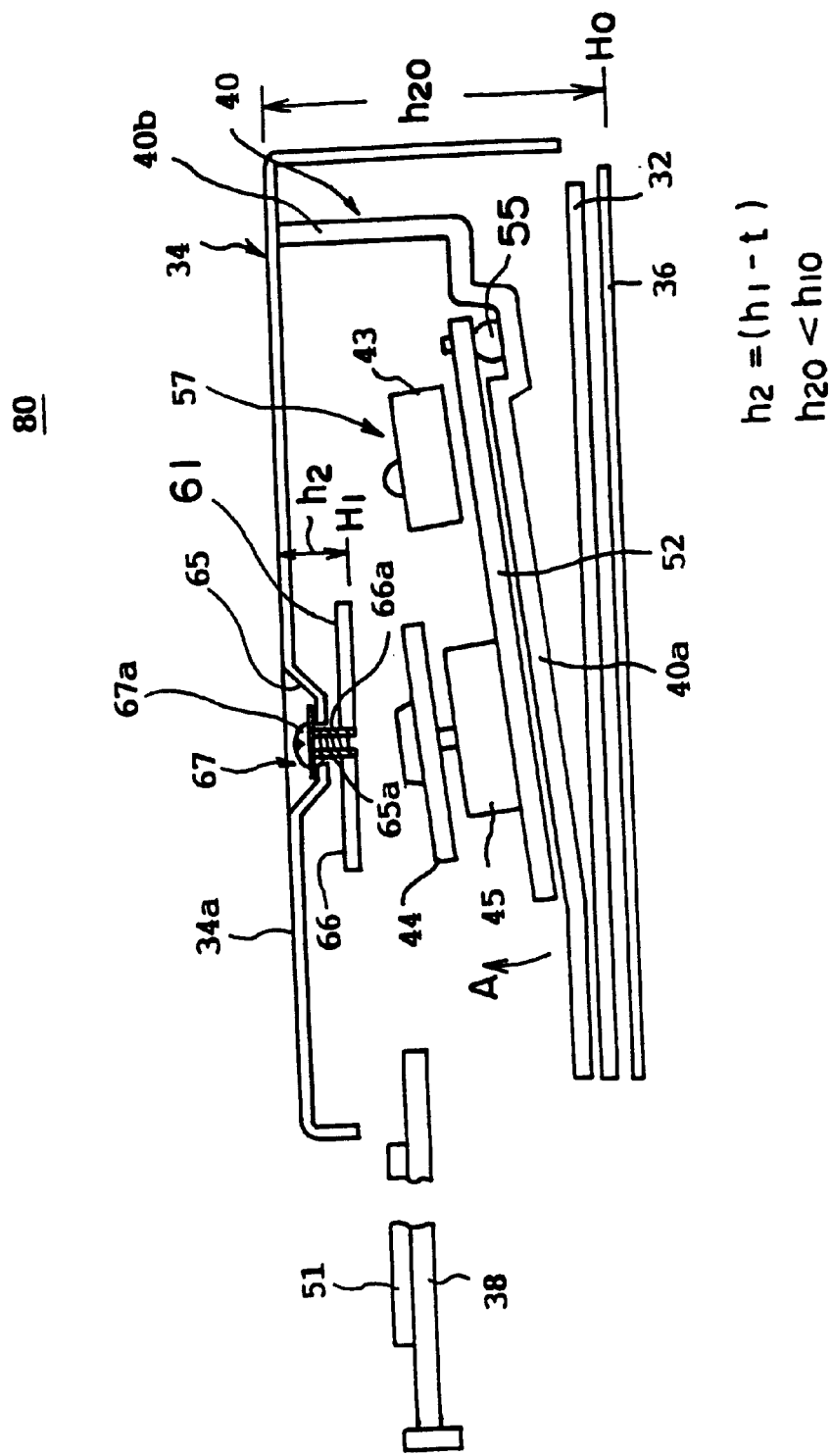
FIG. 10 is an illustration of the CD-ROM apparatus of FIG. 6, showing a state before a disk is loaded.
Figure 11:
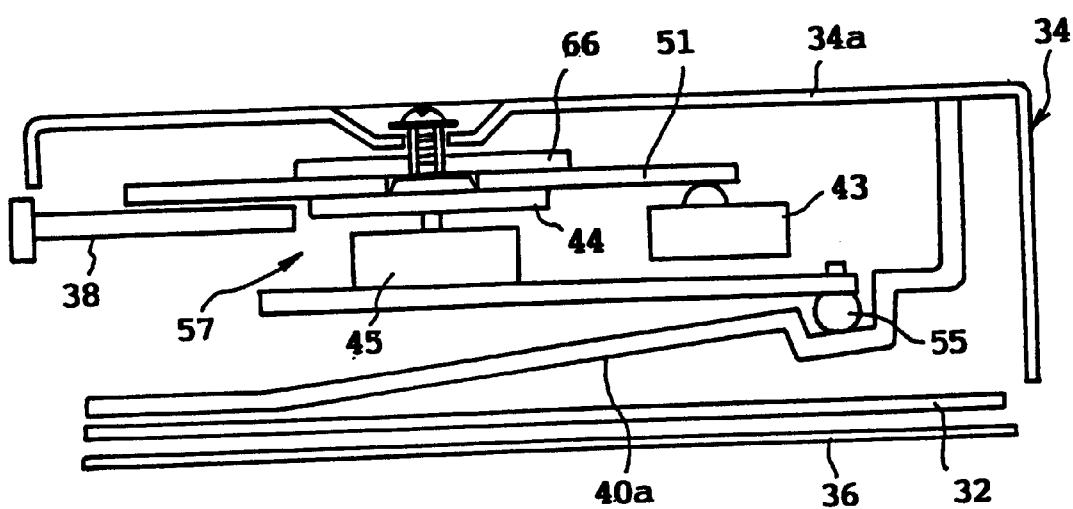
FIG. 11 is an illustration of the CD-ROM apparatus of FIG. 6, showing a state after a disk is loaded.

FIGS. 10 and 11 are illustrations for explaining a disk loading operation of the CD-ROM apparatus 80.

A mechanism unit 57 comprises the turn table 44, the turn table driving motor 45, the optical head 42 and the optical head moving mechanism 43 mounted on a base 52.

One side of the base 52 is supported on the chassis body 40a via an insulator 55, and thus the base 52 is rotatable in a direction indicated by an arrow A of FIG. 10 about the insulator 55. A clamper mounting portion 65 is formed as a recess in the center of the top plate 34a of the case 34.

A stem 66a of a clamper 66 loosely fits in a hole 65a formed in a clamper mounting portion 65. A screw 67 is screwed from the outside of the case into a threaded hole of the stem 66a, and thus the clamper 66 is attached on the top plate 34a of the case 34. A screw head 67a of the screw 67 is accommodated within the clamper mounting portion 65.

A description will now be given of a disk loading operation.

In an initial state, the mechanism unit 57 is inclined as shown in FIG. 10, and thus the turn table 44 is at a lower position. A user places the disk 51 on the tray 38, and then press a loading button not shown in the figure. The tray moving mechanism 46 then starts to operate to retract the tray into the CD-ROM apparatus 80, and therefore the disk 51 is carried into the CD-ROM apparatus 80.

The mechanism unit 57 is then rotated to a horizontal position indicated in FIG. 11 by the mechanism 46 in the direction indicated by the arrow A of FIG. 10. At this time, the turn table 44 lifts the disk 51 and the disk 51 lifts the clamper 66. The clamper 66 is magnetically attracted by the turn table 44. Accordingly, the disk 51 is supported on the turn table 44 in a state where the disk 51 is slightly apart from the tray 38, and is clamped by the clamper 66 on the turn table 44.

The disk 51 is loaded in the manner mentioned above, and then the turn table 44 is rotated by means of the motor 45, and information on the disk 51 is reproduced by means of the optical head 42.

When an unloading operation is performed, each of the mechanisms of the CD-ROM apparatus 80 is operated in the reverse order so that the disk 51 is unclamped and ejected by the tray 38.

Figure 3A:
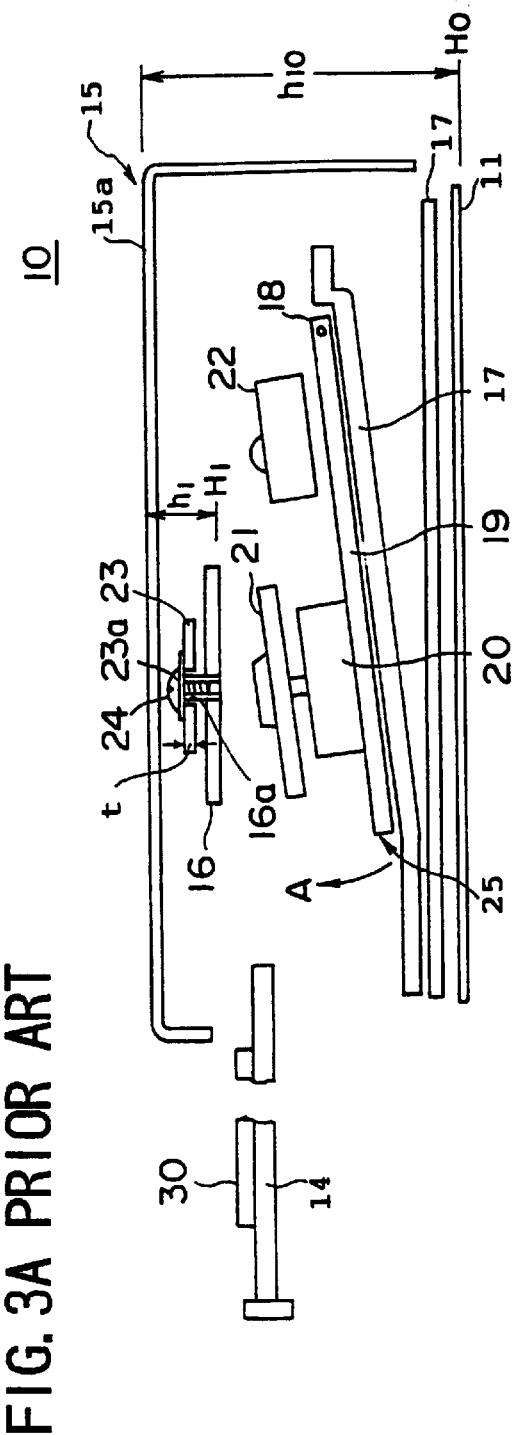
FIGS. 3A and 3B are illustrations for explaining an operation of the clamping mechanism shown in FIG. 2.
Figure 3B:
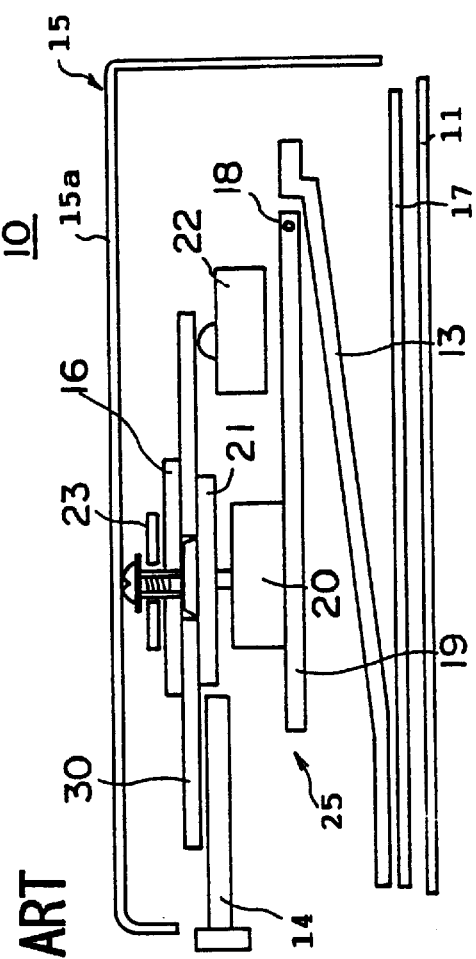
Figure 4:
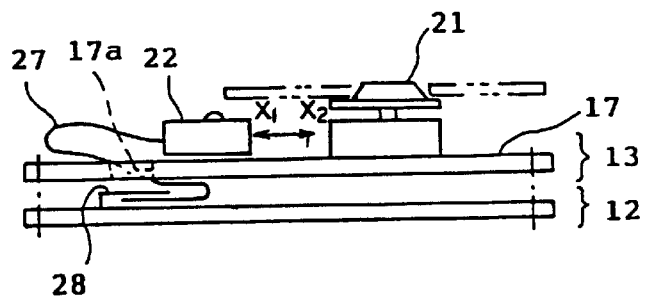
FIG. 4 is an illustration for explaining how an optical head is connected to a circuit board assembly in the conventional disk apparatus.
Figure 5:
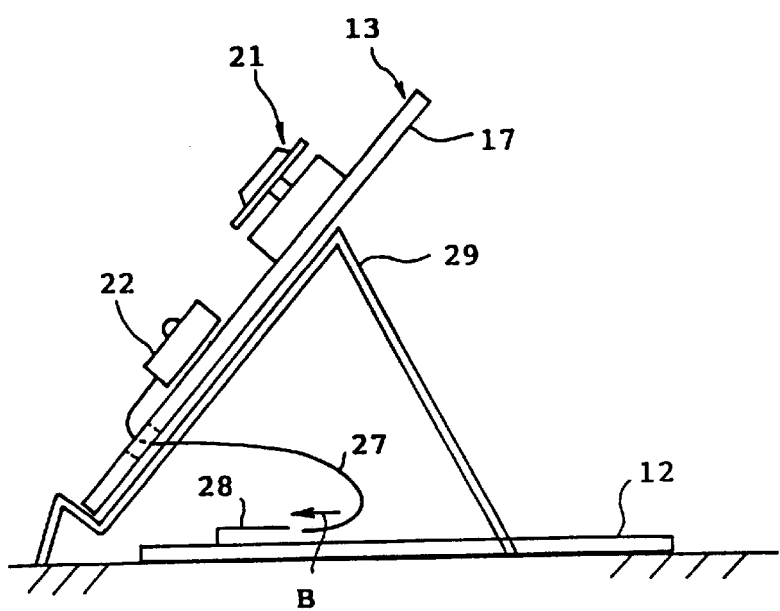
FIG. 5 is an illustration for explaining an operation for connecting the optical head with the circuit board assembly shown in FIG. 4.

A comparison will now be made of a height of the CD-ROM apparatus 80 with that of the conventional optical disk apparatus shown in FIG. 3A. Referring to the FIGS. 11 and 3A, the bases 36 and 11 are positioned at the same level $H_1$. In the conventional optical disk apparatus 10, the clamper supporting member 23 is located between the clamper 16 and the top plate 15a of the case 15. On the other hand, in the CD-ROM apparatus 80 according to the present invention, no member is located between the clasper 66 and the top plate 34a of the case 34.

Assuming that a distance in a height direction between the clamper 16 and the top plate 15a of the case 15 of the conventional optical disk apparatus 10 is $h_1$, a distance $h_2$ between the clamper 66 and the top plate 34a of the case 34 of the CD-ROM apparatus 80 according to the present invention is less than the distance $h_1$ by a thickness t of the clamper supporting member 23.

Accordingly, a height $h_{20}$ (see FIG. 10) of the CD-ROM apparatus 80 is less than a height $h_{10}$ of the conventional optical disk apparatus 10, and thus the CD-ROM apparatus 80 is thinner than the conventional optical disk apparatus.

It should be noted that the appearance of the apparatus according to the present invention is not spoiled because the clamper mounting portion 65 can be hidden by a label such as a caution label being put on the clamper mounting portion 65.

Figure 12:
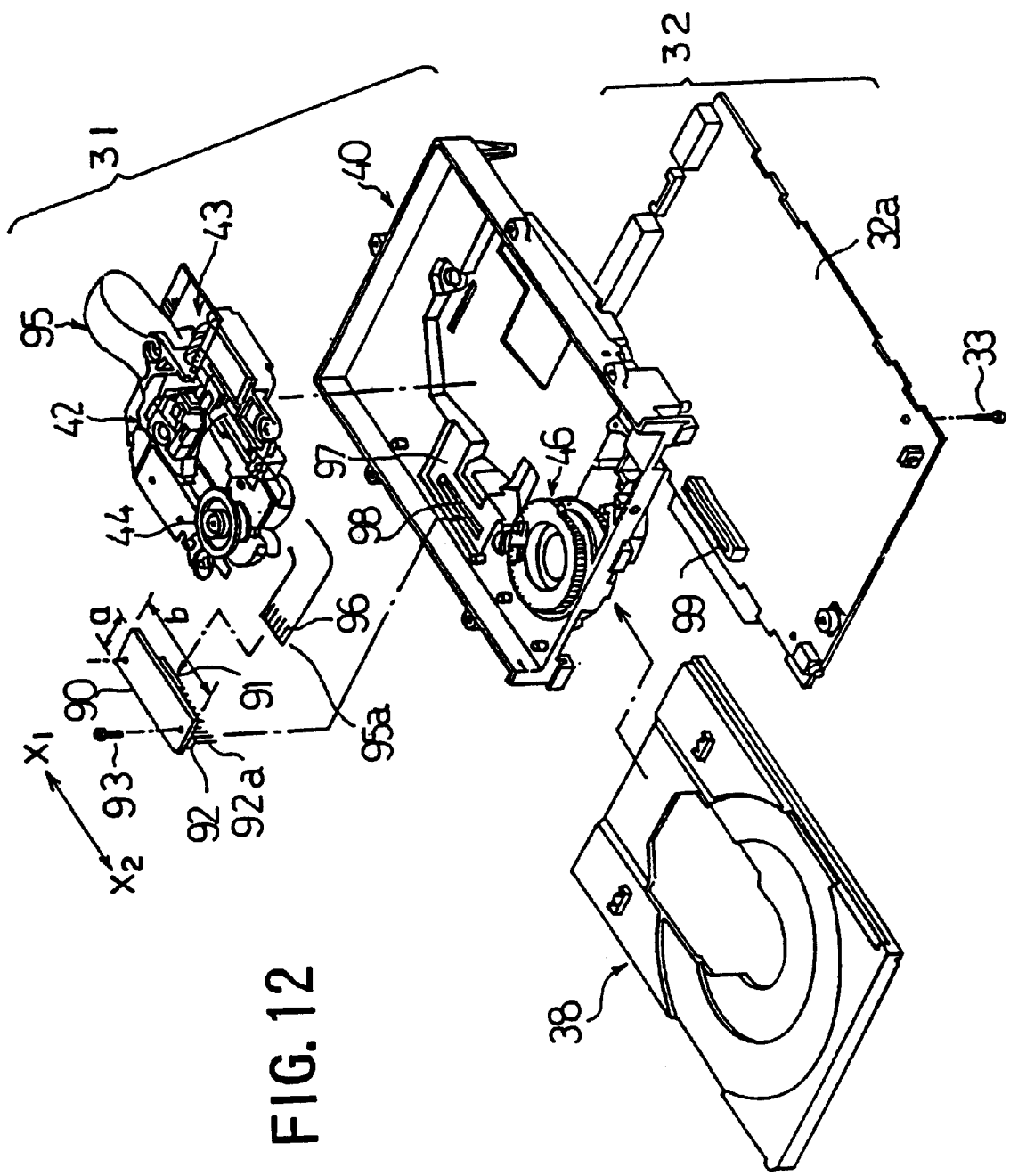
FIG. 12 is a perspective view of an essential part of the CD-ROM apparatus of FIG. 6.
Figure 13:
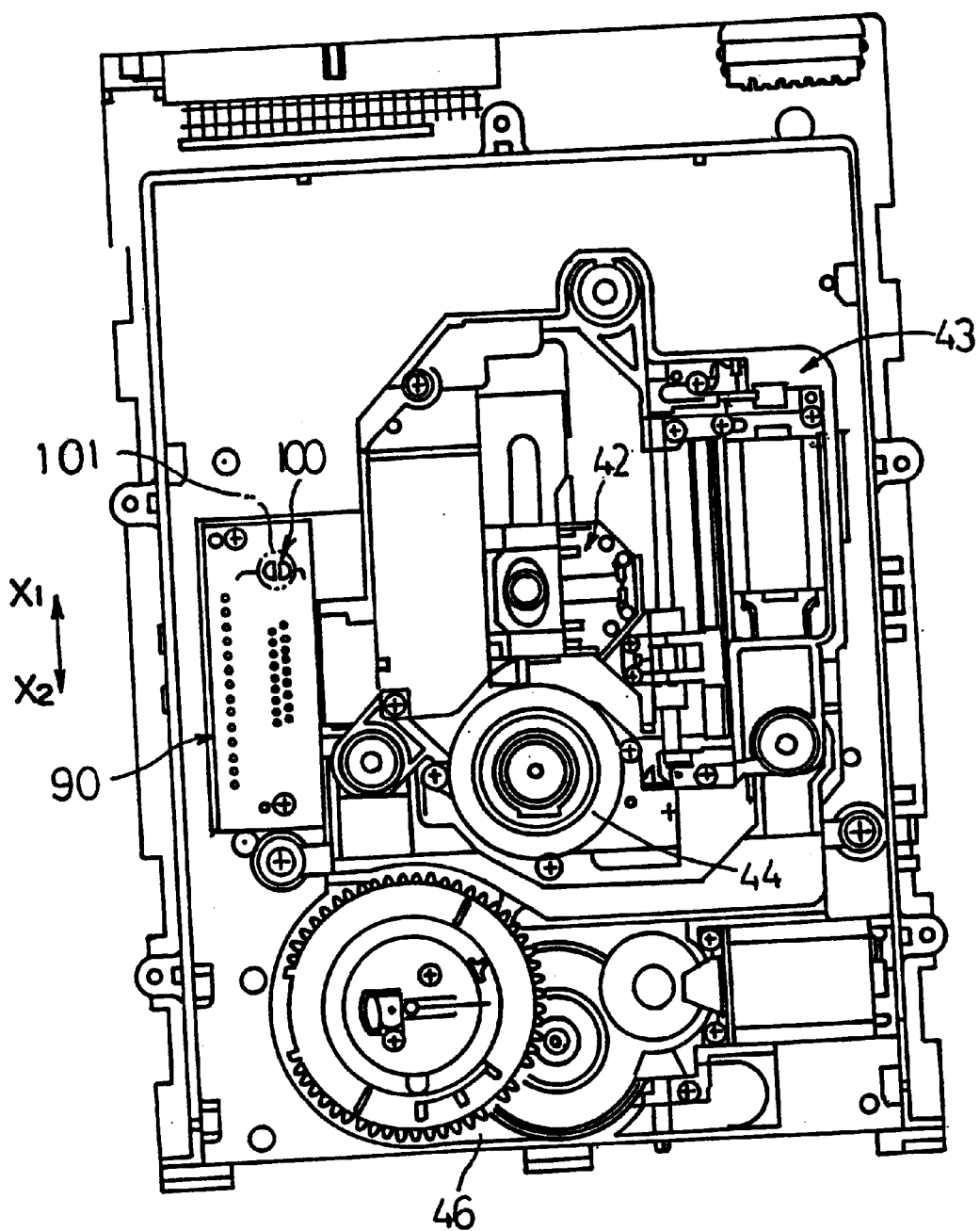
FIG. 13 is a plan view of the inside of the CD-ROM apparatus of FIG. 6.

A description will now be given of how the optical head 42 is electrically connected to the circuit board assembly 32 in the CD-ROM apparatus 80. FIG. 12 is a perspective view of an essential part of the CD-ROM apparatus 80. FIG. 13 is a plane view of inside of the CD-ROM apparatus 80.

In FIGS. 12 and 13, a reference numeral 90 indicates a relay circuit board. The relay circuit board 90 has an easy to handle size 2 cm×5 cm, and has on a bottom surface an FPC connector 91 and a male connector 92 (first connector). In the male connector 92, pins 92a are provided to extend downwardly from the bottom surface of the relay circuit board. A short solder terminal 100 is formed on a top surface of the relay circuit board as shown in FIG. 13.

A tape-like flexible printed circuit (FPC) 95 is drawn out from the optical head 42 in a direction indicated by an arrow X1, and then extended under the optical head 42 in an opposite direction indicated by an arrow X2 by being gently looped. An end of the FPC 95 is formed in an L-shape and has a inserting portion 95a in which terminals 96 are arranged.

A relay circuit board mounting portion 97 is provided in the chassis 40. A rectangular opening 98 formed in the mounting portion 97 corresponds to the shape of the male connector 92.

A female connector 99 (second connector) is mounted on a main circuit board 32a of the circuit board assembly 32 at a position corresponding to the male connector 92 when the mechanism assembly 31 and the circuit board assembly 32 are assembled together. The female connector 99 has terminals 99a which receive the pins 92a of the male connector 92.

Figure 14:
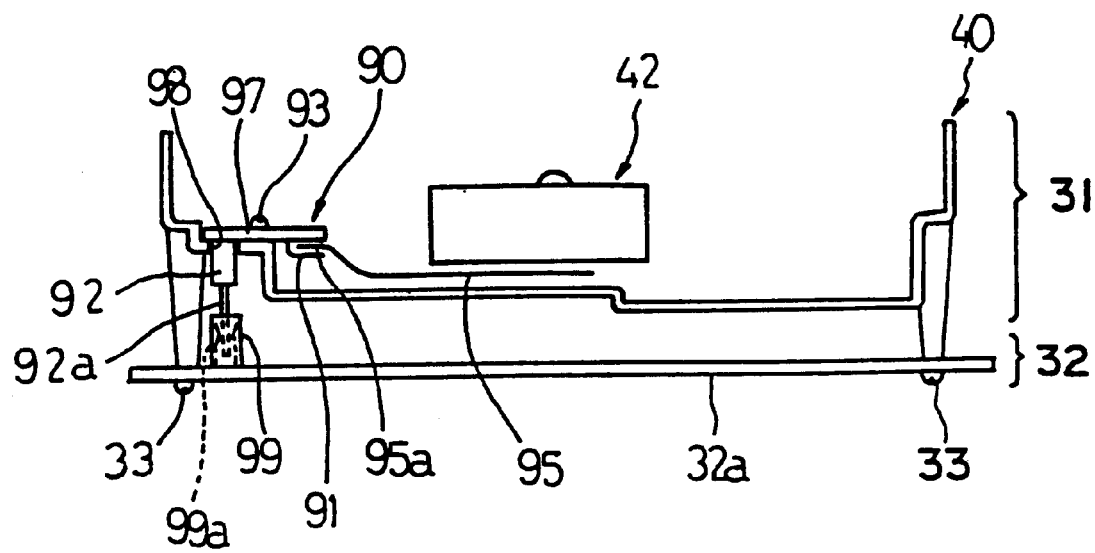
FIG. 14 is an illustration showing how the optical is connected to the circuit board assembly of CD-ROM apparatus of FIG. 6.

Each of the above mentioned parts are connected as shown in FIG. 14. That is, first, an end of the FPC 95 is connected to the FPC connector 91. The relay circuit board 90 is then mounted on the relay circuit board mounting portion 97 of the chassis 40 by means of screws 93. In this state, the male connector 92 is fitted in the opening 98, so that the pins 92a of the male connector 92 are made to protrude downward from the chassis 40. The circuit board assembly 32 is fixed to a bottom side of the chassis 40 by means of screws 33. The pins 92a entered inside the female connector 99, to be connected to the terminal 99a. In this state, the male connector 92 is connected to the female connector 99.

Accordingly, the optical head 42 is electrically connected to the main circuit board 32a via the FPC 95, the FPC connector 91, the relay circuit board 90, the male connector 92 and the female connector 99, in that order.

A description will now be given, with reference to FIGS. 15 and 16, of an assembling operation of the above-mentioned parts.

Figure 15:
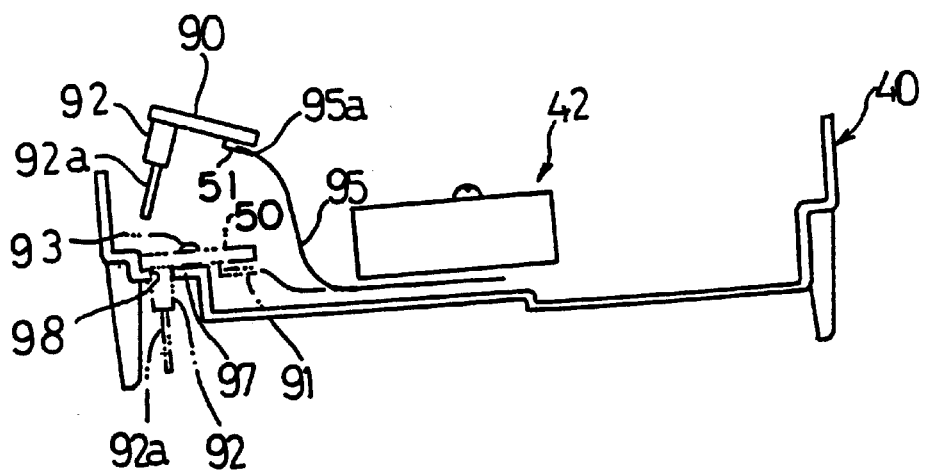
FIG. 15 is an illustration for explaining an assembling operation of a relay circuit board shown in FIG. 6.
Figure 16:
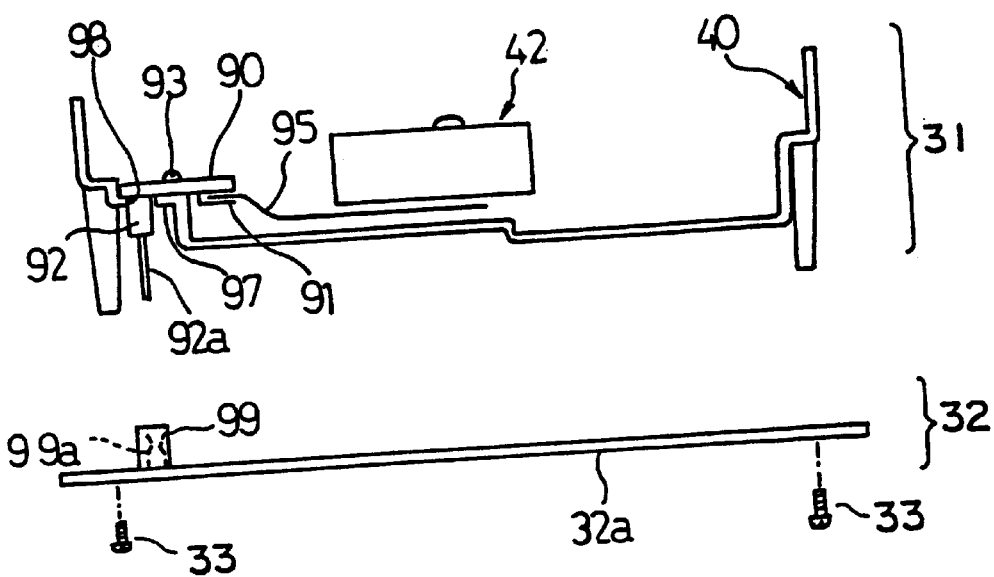
FIG. 16 is an illustration for explaining an operation for assembling together the reproducing unit and the circuit board assembly shown in FIG. 6.

First, as shown in FIG. 15, the inserting portion 95a provided on an end of the FPC 95 is inserted into the FPC connector mounted on the relay circuit board 90. Since the relay circuit board 90 is small in size, the above-mentioned operation can be easily performed. The relay circuit board 90 is positioned on the relay circuit board mounting portion 97 so that the male connector 92 fits in the opening 98, as shown in FIG. 15, and then the relay mounting board 90 is fixed to the chassis 40 by means of the screws 93.

Accordingly, after the mechanism assembly 31 is assembled as described above, it is no longer necessary to handle the FPC 95. Thus, accidental drawing out of the FPC 95 is prevented. It should be noted that the relay circuit board 90 and the FPC 95 are connected to each other before the mechanism assembly is assembled.

Lastly, the mechanism assembly 31 and the circuit board assembly 32 are placed opposite to each other, and then fixed to each other by means of the screws 33. At this time, the male connector 92 is automatically connected to the female connector 99.

As is apparent from the above description, the operation for connecting the optical head 42 to the main circuit board 32a can be performed in a condition in which there is no possibility that the FPC 95 can be drawn out by an excessive force, no special jig is used, and a portion of the operation can be automatically performed in a process in which the mechanism assembly 31 and the circuit board assembly 32 are mechanically connected to each other.

A description will now be given of a short solder 101 shown in FIG. 13.

The short solder 101 is provided in the apparatus to protect a semiconductor laser in the optical head 42 from static electricity damage which may occur during a process for assembling the CD-ROM apparatus 80. The short solder 101 is removed after the optical head 42 is connected to the main circuit board 32a.

In the CD-ROM apparatus 80, since a terminal 100 for the short solder 101 is formed on a top surface of the relay circuit board 90, the short solder 101 is applied, as indicated by a chain line in FIG. 13, on the top surface of the relay circuit board 90. Since the top surface of the relay circuit board 90 faces upward, a solder iron can easily access the short solder, and thus an operation to remove the short solder can be easily performed.

It should be noted that the present invention is not limited to the CD-ROM apparatus, and may be applied to apparatuses handling a compact disk (CD), a magneto-optical disk and a magnetic disk.

The present invention is not limited to the specifically disclosed embodiments, and variations and modification may be made without departing from the scope of the present invention.

What is claimed is:

1. A disk apparatus having a head for reading information recorded on a disk with said disk being loaded into said disk apparatus through an opening in a front bezel on a front side thereof, said disk apparatus comprising:

a turntable mounted on a chassis for rotating the disk with said turntable being movable upwardly so as to move the disk placed on said turntable from an unloaded position to a loaded position;

a case for covering said head, turntable and disk when loaded into said disk apparatus to form a dust proof enclosure except for the opening in the front bezel, said case having a top plate disposed over said turntable to provide a predetermined clearance space between the top plate of the case and turntable with the disk in the unloaded position, said case having side plates extending from said top plate on opposite sides of said disk apparatus with said top plate being unmovable relative to said chassis; and a clamper directly mounted to said top plate of said case and extending into said clearance space so as to clamp the disk on said turntable when the disk is moved to the loaded position by the upward movement of said turntable thereby reducing the clearance space over said turntable in the unloaded position to a minimum and eliminating the need for a separate support for the clamper.

2. The disk apparatus as claimed in claim 1 wherein said top plate has a depressed portion extending into said clearance space which forms a recess in said top plate when viewed from outside said case, said clamper being mounted in said depressed portion.

3. The disk apparatus a claimed in claim 2 wherein said clamper is accommodated in said recess so that the depressed portion of said clamper is below an outer surface of said top plate.

4. The disk apparatus as claimed in claim 3 wherein said recess in said top plate is adapted to be covered by a label.

5. A disk apparatus as defined in claim 3 further comprising:

an undercover forming a first space between said case and said chassis and a second space between said chassis and said undercover with said case being removably connected to said chassis for accommodating the head, tray and turntable;

a head moving mechanism for moving the head of said disk apparatus into said first space, a motorized tray moving mechanism for moving said tray from a position outside said first space to a fixed position inside said first space;

said chassis comprising a chassis body having an open top side, a bottom side, an interior surface positioned over said bottom side opposite the open top side of the chassis with the head being mounted on said interior surface and having side walls extending upright from said interior surface so that said interior surface, the tray, the tray moving mechanism, the head and the head moving mechanism are exposed through the open top side, each of said side walls having a contacting surface on an upper end thereof, the contacting surface of each side wall being positioned to engage said case so as to close the open top side of said chassis, the tray being movable between said position outside said chassis to said position inside said chassis through an opening provided in one of the side walls which faces the front bezel of said disk apparatus;

said tray including a front panel on a front end thereof so as to close said opening of said one of the side walls when the tray is positioned at said second position within said chassis;

said undercover being connected to said chassis for enclosing the bottom side of said chassis within said second space with said second space being open to the atmosphere; and a circuit board assembly positioned inside said second space for exposure to the atmosphere between the bottom side of said chassis and said undercover and having a circuit which processes information input from the head;

wherein when said opening in said chassis is closed said chassis together with said case and said front bezel forms a sealed enclosure with said first space sealed off from the atmosphere and with the tray, the tray moving mechanism, the turntable, the head and the head moving mechanism accommodated inside said sealed enclosure so as to be protected from external dust and wherein the tray moving mechanism and the mechanical unit moving mechanism are formed as a single unit located on a front side of the chassis adjacent said opening to block dust from entering into said first space when said tray is outside said chassis and with the top side of the single unit being covered by the tray when the tray is retracted in the disk apparatus.

6. The disk apparatus as claimed in claim 5, wherein a flexible connecting wire transmitting information from said disk is extended from said head, one end of said flexible connecting wire being connected to a first connector provided on said chassis, said first connector having connector pins protruding downward from said chassis and wherein said circuit board assembly has a second connector at a position corresponding to that of said connector pins of said first connector so that said first connector is automatically connected to said second connector when said circuit board assembly and said chassis are assembled together.

* * * * *

UNITED STATES PATENT AND TRADEMARK OFFICE
CERTIFICATE OF CORRECTION

PATENT NO. : 6,222,817 B1
DATED : April 24, 2001
INVENTOR(S) : Uchino et al.

It is certified that error appears in the above-identified patent and that said Letters Patent is hereby corrected as shown below:

<u>Title page,</u>
Item [75] Inventors: please delete the following third and fouth inventors: 3) Hiroyuki HANAI and 4) Mitsunori NAKAMURA Signed and Sealed this Twenty-sixth Day of February, 2002

Attest:

Attesting Officer

JAMES E. ROGAN
*Director of the United States Patent and Trademark Office*